United States Patent

[11] 3,547,427

| [72] | Inventors | Samuel T. Kelly<br>Torrance;<br>Donald K. Murrell, La Mirada, Calif. |
|---|---|---|
| [21] | Appl. No. | 740,503 |
| [22] | Filed | June 27, 1968 |
| [45] | Patented | Dec. 15, 1970 |
| [73] | Assignee | Robertshaw Controls Company<br>Richmond, Va.<br>a corporation of Delaware |

[54] RESET MECHANISM FOR A SPRING ASSEMBLY
5 Claims, 6 Drawing Figs.
[52] U.S. Cl. .................................................. 267/175;
137/505.41
[51] Int. Cl. .................................................. F16f 1/12
[50] Field of Search ........................................... 137/495,
505.38, 505.39, 505.41, 505.42, 116.5; 267/1BB,
1BBZD

[56] References Cited
UNITED STATES PATENTS

| 2,735,669 | 2/1956 | Seiler ............................ | 267/1 |
| 2,764,996 | 10/1956 | Brown ........................... | 137/505.42X |
| 2,868,224 | 1/1959 | Karlsson ....................... | 137/505.42X |
| 3,279,495 | 10/1966 | Taylor ........................... | 137/505.41X |
| 3,338,264 | 8/1967 | Dykzeul ......................... | 137/505.41 |

Primary Examiner—Harold W. Weakley
Attorneys—Christen, Sabol and O'Brien, Auzville Jackson, Jr. and Robert L. Marben ABSTRACT: A resettable spring assembly for a pressure regulator control device which has the conventional structure of a flexible diaphragm responsive to a pressure force on one side and a biasing force on an opposite side with the biasing means adjusted to a predetermined regulator setting, is additionally provided with a two position adjustment in the form of a biased shaft movable between spaced abutments with cam surfaces between such abutments to preclude any intermediate shaft positioning so that the shaft may reset the biasing means to a second predetermined regulator setting.

PATENTED DEC 15 1970
3,547,427
SHEET 1 OF 2
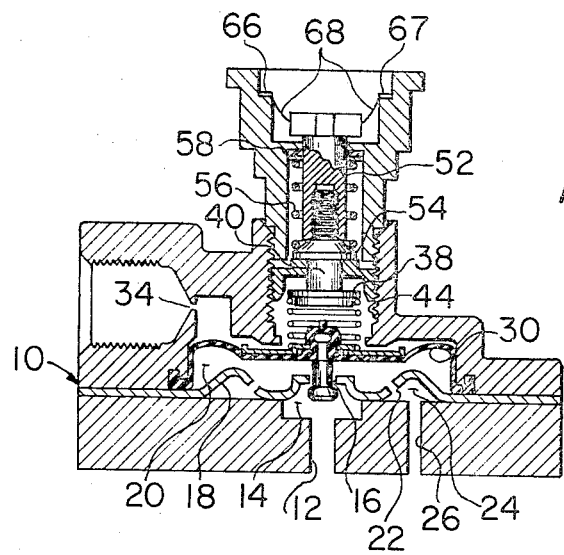
FIG. 1
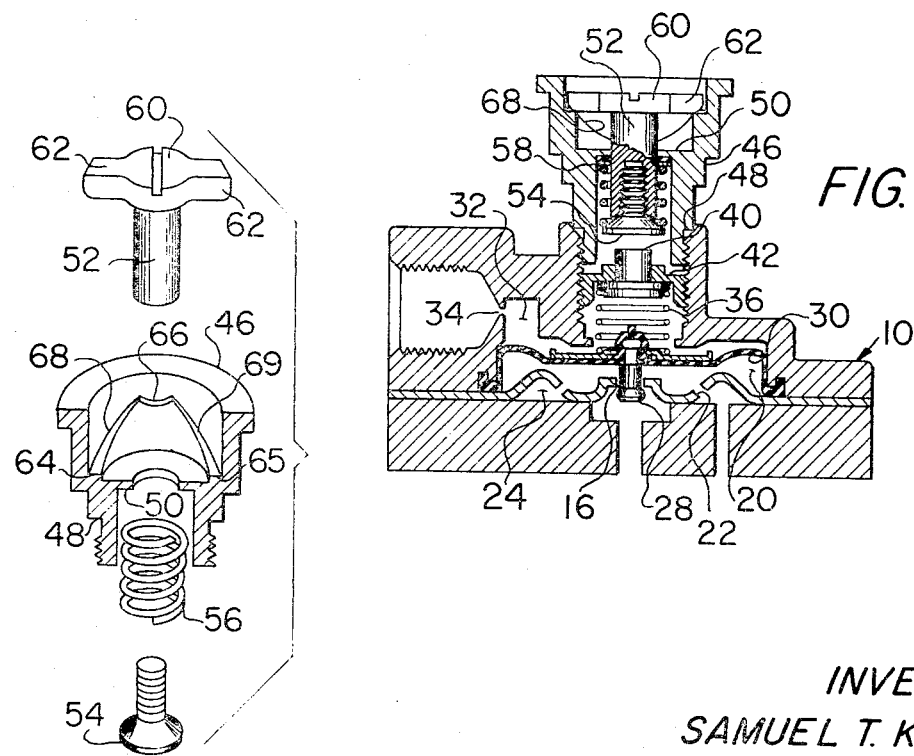
FIG. 2
FIG. 3
INVENTORS
SAMUEL T. KELLY
DONALD K. MURRELL
Christen, Sabol & O'Brien
ATTORNEYS

INVENTORS
SAMUEL T. KELLY
DONALD K. MURRELL

Christen, Sabol & O'Brien
ATTORNEYS

RESET MECHANISM FOR A SPRING ASSEMBLY

BACKGROUND OF THE INVENTION

1. Field of the Invention

This invention relates to a pressure regulator for delivering a fluid flow at a predetermined pressure, and in particular, to such a regulator provided with adjustment means to select one of two predetermined pressures to accommodate the type of fluid being utilized.

2. Description of the Prior Art

The prior art, as exemplified by U.S. Pat. No. 3,338,264 is cognizant of the general problem associated with a pressure regulating device designed to regulate the pressure of two different types of fluids, e.g. the pressure of natural gas and the pressure of liquid petroleum gas for different types of burner apparatus. However, the known prior art regulators do not have any mechanism to assure that the pressure regulator settings are properly set so that it is possible for such a regulator to be inadvertently set to an intermediate position and thus cause malfunction of the burner apparatus.

SUMMARY OF THE INVENTION

In accordance with the present invention, it is not possible to set a pressure regulator at any setting intermediate its predetermined high and low settings. In practicing the present invention, a pressure regulator includes a casing having valve means connected to a flexible diaphragm, one side of which is subject to outlet pressure while its other side is subject to the force of a biasing spring that is adjusted to a first predetermined pressure setting, a biased operator element movable from a first position corresponding to the first pressure setting to a second position for resetting the biasing spring to a second predetermined pressure setting, spaced abutments on the casing are alternately engaged by the operator element to define its first and second positions, and cam surfaces between such abutments to prevent the biased operator element from resting at any intermediate pressure setting.

An object of the present invention is to assure the setting of the spring assembly in a control device to one of two positions.

The present invention has another object in that the spring assembly of a pressure regulator is provided with a reset mechanism that precludes intermediate settings between first and second pressure settings.

Other objects and advantages of the present invention will become apparent from the following description taken in conjunction with the accompanying drawing.

BRIEF DESCRIPTION OF THE DRAWING

FIG. 1 is a cross section of a pressure regulating device embodying the present invention;

FIG. 2 is a cross section similar to FIG. 1 but showing the adjustment mechanism in a different position;

FIG. 3 is an exploded perspective view of the adjustment mechanism with a part in section;

DESCRIPTION OF THE PREFERRED EMBODIMENTS

Figure 4:
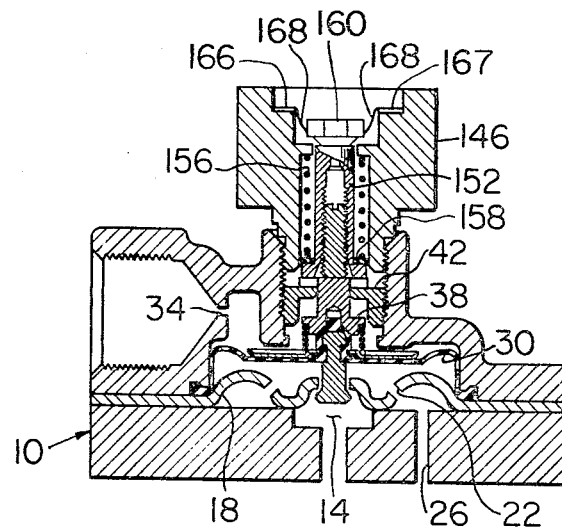
FIG. 4 is a cross section of a pressure regulating device showing a modification of FIG. 1.

As is illustrated in FIGS. 1 and 2, the present invention is embodied in a pressure regulator, indicated generally at 10, having an inlet 12 leading to an inlet chamber 14; a valve seat 16 centrally located in a fixed plate 18 separates the inlet chamber 14 from a pressure chamber 20. The fixed plate 18 has an annular bulge with a plurality of apertures 22 circumferentially spaced about the annular bulge to maintain communication between the pressure chamber 20 and an outlet chamber 24. One wall of the outlet chamber 24 is defined by the annular bulge and thus has an annular configuration with a hemispherical cross section; the outlet chamber 24 leads to outlet 26 in the casing 10.

A valve element 28 cooperates with the upstream side of valve seat 16 and has a stem protruding therethrough with its end affixed to the central portion of a flexible diaphragm 30 which is sealed and mounted at its periphery to adjacent sections of the casing 10. The diaphragm 30 defines a movable wall between the lower chamber 20 and the upper chamber 32 which is vented at orifice 34 to a connection for communication with the atmosphere or with a fluid having a pressure different from the atmospheric pressure. A coil spring 36 is disposed in the upper chamber 32 and is mounted in compression between a plate fixed to the central position of diaphragm 30 and the head 38 of plunger 40 which is slidably disposed in the central boss of spring adjustment screw 42. The plunger head 38 is normally biased toward the boss of screw 42 that has external threads for axial adjustment in a threaded bore 44 in the top of casing 10.

The top portion of threaded bore 44 also provides a mounting for cylindrical housing 46 having lower external threads and an annular external shoulder 48 which engages a conical surface defining the open end of bore 44 and limiting the position to which the housing 46 is threaded into the bore 44. The housing 46 has a centrally apertured partition 50 through which an operator element or shaft 52 is slidably and rotatably disposed. The inner end of the shaft 52 has a threaded bore adjustably carrying a threaded screw with a flanged head 54; a coil spring 56 surrounds the inner part of shaft 52 and is mounted in compression between the flange 54 and an annular seal assembly 58 that abuts the partition 50. The outer end of shaft 52 is provided with a tool receiving head 60 with diametrically opposed shoulders 62. On the top of partition 50, the cylindrical housing is provided with a pair of lower abutments 64—65 diametrically spaced from each other and a pair of upper abutments 66—67 also diametrically spaced from each other and displaced 90° from the lower abutments 64—65. A pair of sloping walls defining cam surfaces 68—68 extend from the upper abutments 66—67 to the lower abutment 64; similarly, a second pair of cam surfaces 69–69 extend from the upper abutments 66—67 to the lower abutment 65. The shaft 52 is axially moved by rotation of its head 60 so that its shoulders 62 slide between the lower and upper abutments 64—65 and 66—67, respectively.

The pressure regulator of the present invention may be utilized as a direct control for a gas as shown in the above U.S. Pat. No. 3,338,264 or it may be utilized as an indirect control by controlling the bleed line of a combination control device as shown in U.S. Pat No. 3,235,180. In any event, the fluid flow entering the inlet 12 is pressure regulated according to a particular regulator setting so that the pressure of the flow leaving outlet 26 is substantially constant.

FIG. 2 represents the various positions of the elements when the pressure regulator is adjusted to a first position defining a natural gas setting. This particular setting is usually a factory operation accomplished by rotating the adjusting nut 42 with a suitable tool so that the spring rate of coil spring 36 exerts the desired biasing force on the diaphragm 30; thereafter, the cylindrical housing 46 is mounted in the threaded bore 44, however, the flanged head 54 is not in engagement with the plunger 40 because the shoulders 62 are biased on the upper abutments 66—67 by the coil spring 56. In this position, the diaphragm 30 functions in the well-known manner to deliver the flow to the outlet 26 at a constant pressure in accordance with the capacity requirements of a gas burner utilizing natural gas.

If it is desired to convert the pressure regulator to liquid petroleum pressures, the shaft head 60 is rotated 90° by a suitable tool such as a screw driver. Once the shoulders 62 are rotated horizontally past the upper abutments 66—67, the shaft 52 is biased axially by the coil spring 56 along a pair of opposed camming surfaces 68—69 to its second position wherein the shoulders 62 are biased against the lower abutments 64—65. In its FIG. 1 position the flange head 54 is biased into engagement with the central boss of the nut 42 causing depression of the plunger 40; thus, the plunger head 38 resets the spring rate of its coil spring 36 whereby the diaphragm 30 and valve 28 are positioned to regulate the pressure of liquid petroleum gas. The particular adjustment for the liquid petroleum setting is accomplished by rotating the flange head 54 in the threaded bore of a shaft 52. For this purpose the flange head 54 is slotted to receive a suitable tool. Such an adjustment is usually performed at the factory before the cylindrical housing 46 is threaded into the casing bore 44. Of course field adjustment is also possible by merely removing the housing 46 which includes all of the elements necessary for the adjustment.

In order to convert back to a natural gas setting, the shaft head 60 is rotated 90° against the bias of the coil spring 56 causing the shoulders 62 to ride up a pair of opposed camming surfaces 68—69 until the shoulders 62 rest on the pair of upper abutments 66—67. The plunger 40 is thus released and the coil spring 36 forces the plunger head 38 against the adjusting nut 42; the biasing force of the coil spring 36 is now reset to conform to its original position shown in FIG. 2.

The four camming surfaces 68—69 permit rotation of the operator shaft 52 in either a clockwise or counterclockwise rotation so that the reset conversion may be simply performed by an unskilled person without specific instructions. The shaft 52 can only assume two positions because the biased shaft will cause the shoulders 62 to ride down the cam surfaces 68—69 whenever the shoulders 62 are not engaging the abutments 66—67. Such an arrangement precludes any intermediate settings of the shaft 52 so that the regulator can only be set at a natural gas setting or a liquid petroleum gas setting. The elimination of intermediate settings removes a great hazard from gas burner apparatus that has been specifically designed for a particular type of gas. In addition, once the factory adjustment has been made, there is no need for further calibration since the plunger 40 is set and reset through a particular displacement that remains constant.

Figure 5:
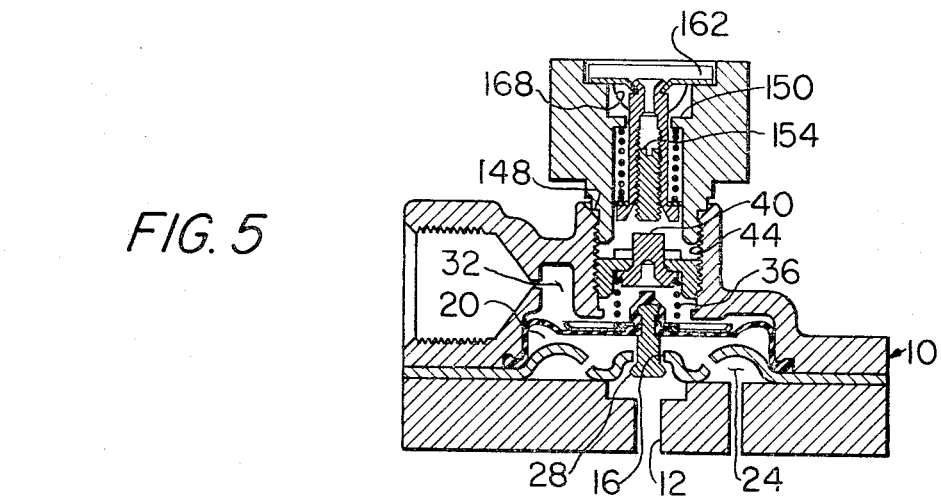
FIG. 5 is a cross section similar to FIG. 4 but showing the adjustment mechanism in a different position.
Figure 6:
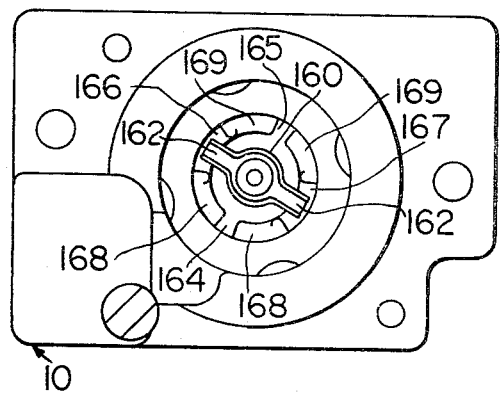
FIG. 6 is a top plan of FIG. 5.

A second embodiment of the present invention is illustrated in FIGS. 4, 5 and 6 wherein the same reference numerals are utilized for those parts which are identical to parts already described in FIGS. 1—3, and wherein reference numerals with 100 added are utilized to describe parts that are similar to those found in FIGS. 1—3. For example, the parts 10 through 44, inclusive, are identical to those parts already described in connection with FIGS. 1—3 whereas the second embodiment relates to the structural arrangement of the two position adjustment mechanism contained as a unit in the cylindrical housing 146.

As is shown in FIGS. 4 and 5, the housing 146 has lower external threads received in the threaded bore 44 and an annular external shoulder 148 which engages the conical surface defining the open end of the bore 44 and limiting the position to which the housing 146 is threaded therein. The housing 146 has a centrally apertured partition 150 through which an operator element in the form of a sleeve 152 is slidably and rotatably disposed. The sleeve 152 is in the form of a cylinder open at both ends with a setscrew 154 adjustably threaded in the inner end of the sleeve 152. A coil spring 156 surrounds the lower part of the sleeve 152 and is mounted in compression between the partition 150 and an annular seal assembly 158 disposed on an annular flange that is the lowermost part of the sleeve 152. The upper end of sleeve 152 is provided with a tool receiving head 160 having diametrically opposed shoulders 162.

On the top of the partition 150, the cylindrical housing 146 is provided with a pair of lower abutments 164—165 diametrically spaced from each other and a pair of upper abutments 166—167 also diametrically spaced from each other and radially displaced 90° from the lower abutments 164—165. A pair of slotted walls defining cam surfaces 168—168 extend from the upper abutments 166—167 to the lower abutments 164; similarly, a second pair of cam surfaces 169—169 extend from the upper abutments 166—167 to the lower abutment 165. The operator element or sleeve 152 is axially movable by rotation of its head 160 so that its shoulders 162 slide between the lower and upper abutments 164—165 and 166—167, respectively.

The functions of the elements described in connection with FIGS. 4, 5 and 6 are substantially the same as that described with respect to FIGS. 1—3 so that a description of the sequence of operation will not be repeated for the sake of brevity. The particular distinction of the modification of FIGS. 4—6 over FIGS. 1—3 resides in the construction of the operator 152 which is in the form of a hollow sleeve permitting a tool to be inserted from the top whereby the setscrew 154 may be adjusted. Thus, the housing 146 does not have to be removed whenever it is desired to adjust the setting for the liquid petroleum pressures. While the adjustment of the liquid petroleum setting is usually a factory operation, it can also be accomplished in the field without the removal of the housing 146. Such adjustment is accomplished by a tool inserted through the sleeve 152 to adjust the setscrew 154 and its abutting position relative to the plunger 140.

It should be noted that in each of the modifications there is an adjustment for the natural gas setting by means of the spring adjustment screw 42 and there is an adjustment for the liquid petroleum setting by means of the flanged head 54 on the adjustment screw in FIGS. 1—3 and by means of the setscrew 154 in FIGS. 4—6. Once these two adjustments have been made the pressure regulator may then be manually reset between its natural gas setting and its liquid petroleum setting by rotation of the operator head 60 (FIG. 1) and 160 (FIG. 4) without any intermediate setting therebetween.

Inasmuch as the present invention is subject to many modifications, variations and changes in detail, it is intended that all matter contained in the foregoing description or shown on the accompanying drawings, shall be interpreted as illustrative and not in a limiting sense.

We claim:

1. A resettable spring assembly for a control device comprising:
a casing;
biasing means in said casing adapted to exert a biasing force on a control device;
adjusting means for said biasing means to set its biasing force at a first predetermined setting;
an operator having upper and lower head elements and being movable between first and second positions;
diametrically opposed shoulders on said upper head element;
first and second abutment means on said casing alternately engaged by said shoulders to define the first and second positions for said operator;
said lower head element effecting movement of said biasing means between its first predetermined setting and a second predetermined setting when said operator is moved from its first position to its second position;
spring means biasing said operator; and
cam means including angularly inclined surfaces extending between said first and second abutment means and engaged by said shoulders during movement of said operator to assure complete movement thereof between its first and second positions whereby said biasing means is precluded from any intermediate setting between its first and second predetermined settings.

2. The invention as recited in claim 1 wherein said first abutments means comprises a pair of diametrically opposed upper abutments and said second abutment means comprises a pair of diametrically opposed lower abutments.

3. The invention as recited in claim 2 wherein said upper abutments are radially spaced from said lower abutments.

4. The invention as recited in claim 1 wherein said operator includes a shaft having one end attached to said upper head element and having an opposite end adjustably carrying said lower head element to engage said biasing means and reset the same to its second predetermined setting.

5. The invention as recited in claim 1 wherein said operator includes a hollow sleeve having one end attached to said upper head element and having an opposite end adjustably carrying said lower head element, said lower head element including an adjustment screw adapted to engage said biasing means and reset the same to its second predetermined setting, the said one end of said hollow sleeve being open to receive a tool for adjusting said adjustment screw.